US005784554A

United States Patent [19]
Hsiung

[11] Patent Number: 5,784,554
[45] Date of Patent: Jul. 21, 1998

[54] DYNAMIC SAMPLING PROFILER

[75] Inventor: Marianne Hsien-Ming Hsiung, Woodside, Calif.

[73] Assignee: Apple Computer, Inc., Cupertino, Calif.

[21] Appl. No.: 68,898

[22] Filed: May 28, 1993

[51] Int. Cl.$^6$ .................................................. G06F 13/00
[52] U.S. Cl. ............................................................ 395/183.21
[58] Field of Search .......................... 364/921.91, 921.8, 364/229.41, 251.5, 267, 832.2; 395/575, 325, 184.01, 183.13, 183.14, 183.21

[56] References Cited

U.S. PATENT DOCUMENTS

| | | | |
|---|---|---|---|
| 4,086,628 | 4/1978 | Woodram | 364/200 |
| 4,591,983 | 5/1986 | Bennett et al. | 364/403 |
| 5,285,528 | 2/1994 | Hart | 395/725 |
| 5,343,559 | 8/1994 | Lee | 395/425 |
| 5,347,600 | 9/1994 | Basnsley et al. | 382/56 |

OTHER PUBLICATIONS

*Unix Programmer's Manual Reference Guide,* 4.3 B S D ed. University of California, Berkeley, CA Dept. of Electrical Engineering & Computer Science, Apr., 1986, p. 1.
*UNICOS User Command Reference Mannual,* Mendota Heights, MN, Cray Research, Inc. vol. 1 SR–2011 6.0, 1991, pp. 1–5.

*MACINTOSH Programmer's Workshop Introduction,* Introduction To MPW, For MPW version 3.3, Apple Computer, Inc., Cupertino, Developer Technical Publications, 1993, pp. 13–1–13–36.

*Primary Examiner*—Robert W. Beausoliel, Jr.
*Assistant Examiner*—Norman M. Wright
*Attorney, Agent, or Firm*—Blakely, Sokoloff, Taylor & Zafman

[57] ABSTRACT

A dynamic adaptive sampling process for providing performance analysis on a computer system; the sampling process comprising the steps of: generating a profile tree comprising a hierarchy of one or more nodes, each node in the hierarchy comprises an array of counters, with each counter mapped to an associated range of memory locations in the computer memory. The process then receives a program counter value and searches the profile tree according to the hierarchy of nodes to locate an associated counter. The associated counter maps to a corresponding memory range of the finest partition which includes the memory location identified by the program counter value. The sampling process then detects whether the located counter exceeds a threshold value, wherein if the located counter exceeds the threshold value, then the sampling process further comprises modifying the profile tree. Wherein if the located counter does not exceed the threshold value, then incrementing that located counter.

35 Claims, 3 Drawing Sheets

DYNAMIC SAMPLING PROFILER

FIELD OF INVENTION

This invention relates to profiler processes for measuring the performance of a computer system. More particularly, this invention relates to sampling profilers which provide a statistical distribution of the relative proportions of time spent by the CPU in executing in a particular memory address range of a computer.

BACKGROUND

Generating a statistical distribution profile of the CPU operation is particularly useful for performance diagnostic of a computer system. For example, a statistical distribution profile is useful in identifying which applications, such as functions or program procedures, consume a significant CPU time. This information identifies for the user which functions or procedures on which to focus to improve the speed and performance of the computer system. Sampling profiler processes and tracer processes are two types of profiler processes which produce distribution profiles. With the prior art sampling profiler process, a sampling profiler periodically samples the program counter to detect how often the CPU executes various functions and program procedures stored in the various memory address ranges. Typically, a sampling profiler uses a linear array of counters, e.g., one array of counters, to represent an entire memory address range to be evaluated in the computer. Each counter in that linear array is mapped to a narrower address range within that entire memory range being evaluated.

The sampling profiler periodically samples the program counter to detect its current value. The linear array of counters is searched after each sampling of the current program counter value to find an associated counter that comprises the memory range which includes the memory address matching the current program counter value. Once identified, that associated counter is incremented by one to record the CPU's access of the particular memory range identified by the associated counter. The sampling process then continues sampling the program counter value, matching each program counter value to an associated counter in that linear array until a set of program counter values has been generated that represents a statistical distribution profile of the CPU time.

Another type of profiler process is the tracer process. Typically, a tracer provides a set of profiling sequence codes to be executed prior to executing any function block or program procedure. This set of codes increments an associated counter to record the elapsed CPU time each time a function or a program procedure is executed. Tracers thus provide an accurate detailed distribution profiles of the CPU's performance.

The prior art sampling profiler produces a less detailed statistical distribution profile, especially where the memory is densely packed with various functions. Each counter in the linear array is typically associated with a wide memory address range, which maps to several functions stored in a particular memory, and it is, thus, difficult to identify which of these functions is occupying most of the CPU time. With this method, obtaining a higher resolution, or a finer granularity, of this address range would require a large memory allocation. A more detailed profile can be produced with repeated execution of the sampling profiler, focusing on the memory address ranges identified during prior executions as requiring a greater allocation of CPU time. However, repeating the sampling process not only significantly interferes with the user's current operation by requiring the user to re-execute the software, but repeating the sampling process also requires additional processing time to produce the more detailed profile. Having to repeat the process thereby reduces the performance of the sampling profiler and is significantly inconvenient for the user.

The tracer type profiling process is also time-consuming, since a recompilation of the profiling code is typically required in order to initiate the tracer process. Recompilation is often not feasible in many cases because the source code is not available, and recompilation also hinders an accurate measurement of large systems and significantly affects the execution and performance of time-sensitive applications. Moreover, because functions and procedures often occur at irregular intervals, a typical tracer process which is executed prior to each execution of a function or procedure results in a non-uniform perturbation to the system execution of the current application. There is, therefore, a need for an improved and efficient profiler process which provides an accurate statistical distribution profile of the CPU.

SUMMARY OF THE INVENTION

A dynamic sampling profiler process described in accordance with the principles of this invention provides performance analysis on a computer system. The dynamic sampling process comprises the steps of: generating a profile tree comprising a hierarchy of one or more nodes, each node in the hierarchy comprises an array of counters, with each counter mapped to an associated range of memory locations in the computer memory. The process then receives a program counter value and searches the profile tree according to the hierarchy of nodes to locate an associated counter. The associated counter maps to a corresponding memory range of the finest partition which includes the memory location identified by the program counter value. The sampling process then detects whether the located counter exceeds a threshold value. Wherein if the located counter exceeds the threshold value, then the sampling process further comprises modifying the profile tree. Wherein if the located counter does not exceed the threshold value, then the sampling process increments that associated counter.

DETAILED DESCRIPTION

Figure 1:
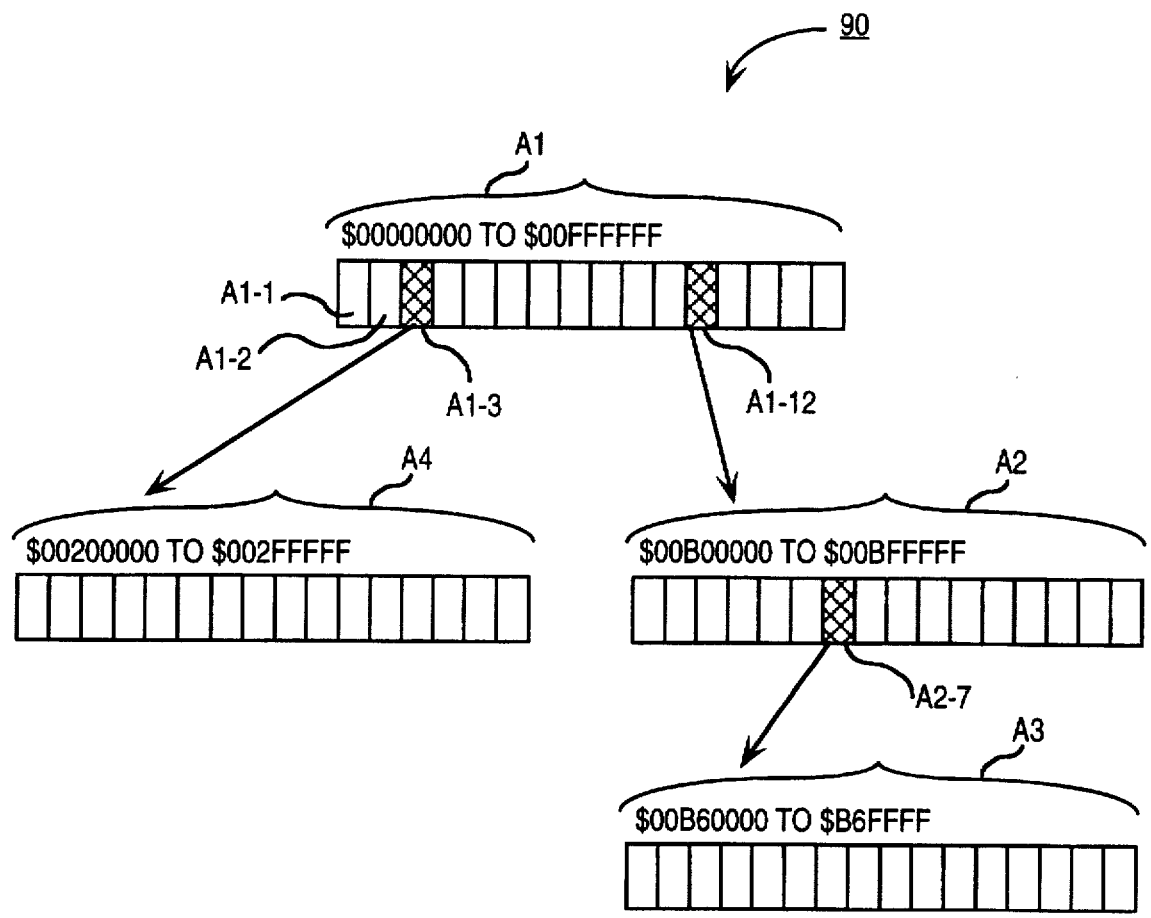
FIG. 1 illustrates a dynamic sampling profile tree constructed in accordance with the principles of this invention.
Figure 2:
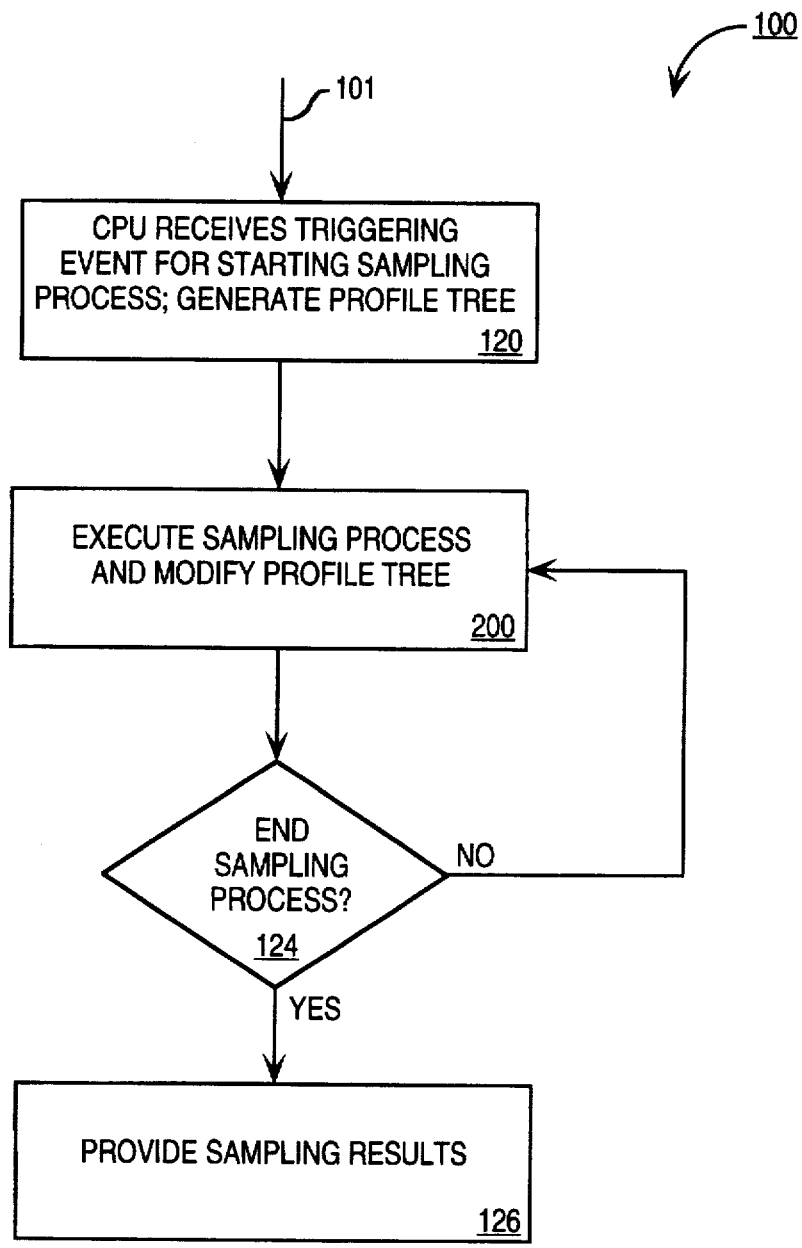
FIG. 2 illustrates a block diagram of a dynamic sampling profiler provided in accordance with the principles of this invention.

FIGS. 1 and 2 illustrate a dynamic sampling profiler provided in accordance to the principles of this invention. FIG. 1 illustrates a profile tree 90 constructed in accordance to a dynamic sampling profiler process 100 of FIG. 2. Profile tree 90 comprises a hierarchy of nodes, nodes A1 to A4, wherein each node Ai comprises an array of counters [Ai-1 ... Ai-n], where n is a parameter corresponding to the maximum number of nodes that can be generated according to the predefined size of memory provided for generating profile tree 90. It is envisioned as within the scope of this invention that the value n can be a predefined value or a dynamic value which changes according to the user's need.

Referring to FIG. 2, when the CPU of the computer system (not shown) receives a triggering event signal 101, sampling profiler process 100 begins in step 120 to generate profiler tree 90 of FIG. 1. A triggering event can be equivalent to the CPU processing a new application request, a key stroke, an instruction command from the user, or other similar event according to the user's need. Initially, at step 120, only node A1, the highest node in profile tree 90 of FIG. 1, is generated. Node A1 is always the first node to be generated, and it represents the entire range of memory to be evaluated in a computer system. In the example illustrated in FIG. 1, node A1 represents 16 megabytes of memory, a memory size corresponding to a 24-bit address machine. Node A1 comprises 16 counters [A1-1 . . . A1-16], each counter A1-i represents an associated one megabyte range of memory within that 16 megabytes of memory. Counter A1-1, for example, represents an associated one megabyte range of the 16 megabytes of computer memory from memory address location $00000000 to address location $000fffff, counter A1-2 represents the next one megabyte range of the computer memory from address location $00100000 to address location $001fffff, and counter A1-3 represents the associated memory range from address location $00200000 to $002fffff. The rest of the entire 16 megabytes of memory is also similarly partitioned and mapped to remaining counters A1-4 . . . A1-16 in node A1.

The number of counter provided in this description is only an example, and it is envisioned as well within the scope of the principles taught by this invention that the number of counters can be different from 16, and that this number can be selected according to the user's need. In the preferred embodiment, the number of counters selected for each node is a number corresponding to a power of 2, e.g., $2^n$ counters. It is also envisioned that the associated memory range of each counter can be a variable parameter and need not be a one megabyte range, nor a constant unit.

As sampling process 100 proceeds, profile tree 90 is continuously modified in process step 200 to include additional nodes, or to delete nodes, until a terminating event signal is detected in step 124. A terminating event can be equivalent to the CPU completing an execution of an application, such as one or more functions or procedures. Alternatively, a terminating event can be based on a specific elapsed time, a key stroke, an instruction command, or other similar event according to the user's need. A detected terminating event terminates further sampling and modifying of profile tree 90. Preferably, in step 126, a sampling profile resulting from sampling step 200 and step 124 is then provided as output to the user.

Figure 3:
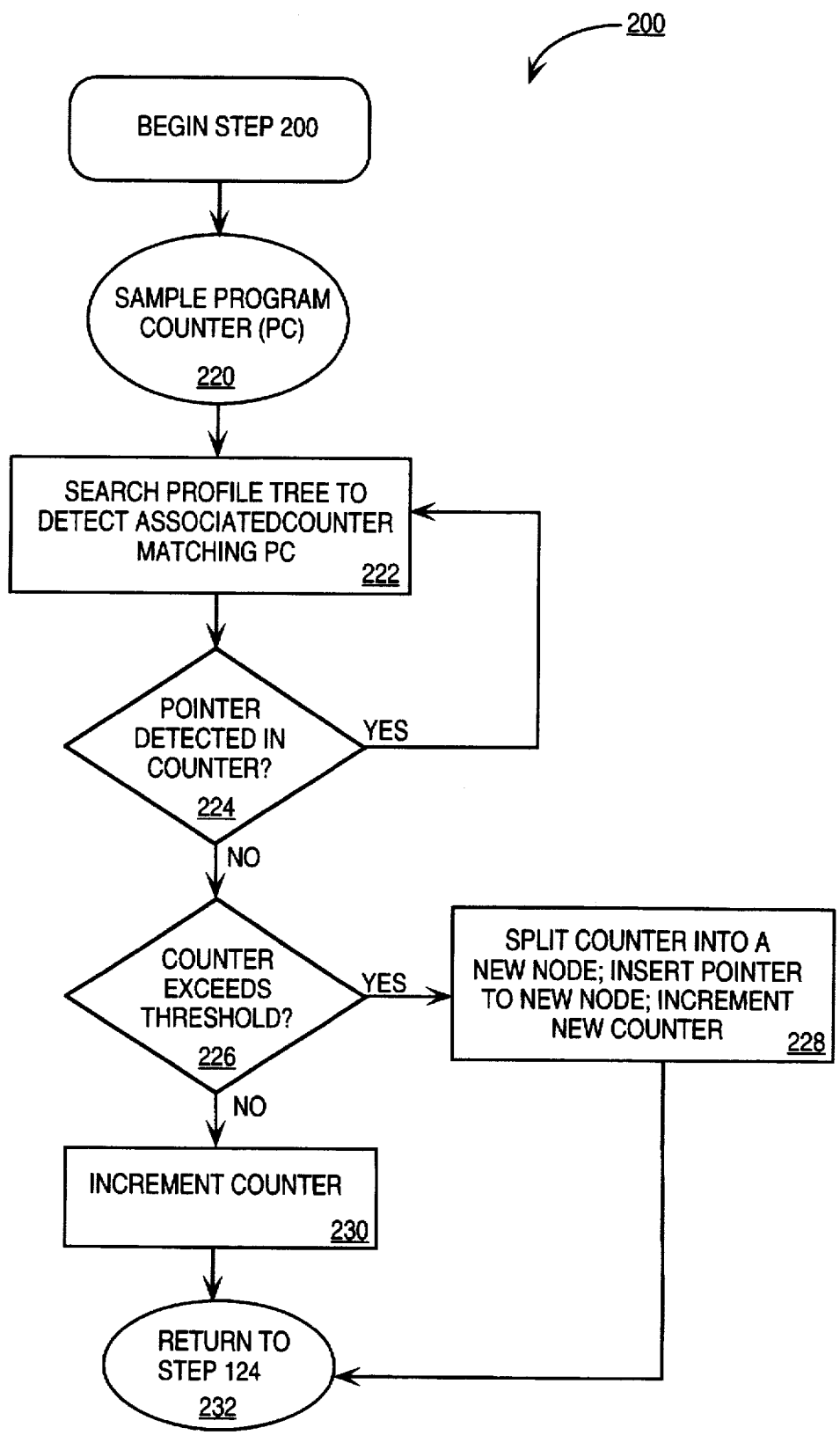
FIG. 3 illustrates a more detailed block diagram of the dynamic sampling profile process shown in FIG. 2.

FIG. 3 illustrates a more detailed block diagram of sampling and modifying profile tree step 200. In step 200, sampling profiler 100 first samples the program counter (PC) 220. Step 222 then performs a search of profile tree 90 comprising node A1 (see FIG. 1) to detect an associated counter A1-i that comprises an address range which includes an address matching the current value of PC. For example, if PC is currently equivalent to address $00b6fff0 during step 222, sampling process 200 search profile tree 90 to detect a matching address to current PC value. Since node A1-12 comprises memory range [$00b00000. . . $00bfffff], sampling process 200 detects node A1-12 as the associated counter which includes $00b6fff0. Once associated counter A1-12 is detected in step 224, step 226 checks to detect whether associated counter A1-12 exceeds a threshold value. If the threshold value is exceeded, counter A1-12 is then partitioned and a new node, node A2 is then added to profile tree 90 (see FIG. 1).

New node A2 comprises an array of counters [A2-1 . . . A2-16], and memory range [$00b00000. . . $00bfffff] is thus partitioned into a finer partition of memory ranges, such that each new counter A2-i is mapped to a finer partition of memory range [$00b00000 . . . $00bfffff]. Node A2 is then searched to detect a new associated counter A2-7 that comprises a finer memory range which includes a memory address corresponding to current PC address $00b6fff. The detected new associated counter A2-7 is then incremented by 1. A new associated pointer is also inserted into counter A1-12 to point to newly added node A2. However, if associated counter A1-12 is detected not to exceed the threshold value, then associated counter A1-12 is incremented by one. Step 232 then returns sample profiler 100 back to step 124 to detect for a terminating event signal (FIG. 2). With reference to FIG. 2, if no terminating event signal is detected in step 124, sampling profiler 100 then returns to step 200 to repeat process steps 220–232, including sampling the current PC value and searching and modifying profile tree 90. In the preferred embodiment, once sampling is completed, the corresponding one or more applications, such as the corresponding functions or procedures, stored within the memory ranges of each counter is also identified to the user.

With sampling profiler 100, profile tree 90 is modified dynamically to include a new node each time an associated counter is located, if that associated counter exceeds a threshold value. The new added node allows sampling profiler 100 to process a finer partition of the memory range corresponding to the located associated counter efficiently without restarting sampling profiler 100, and sampling can be flexibly triggered or terminated according to the user's need, without having to await the completion of the sampling process for each level of partitioning. Sampling profiler 100 thus provides an efficient method of analyzing the CPU performance distribution profile to better guide the optimization of the computer system for improved performance.

Although the present invention has been described particularly with reference to FIGS. 1–3, it will be apparent to one skilled in the art that many variations may be made by one of ordinary skilled in the art, without departing from the scope of the invention disclosed.

I claim:

1. A dynamic adaptive sampling process to provide performance analysis on a computer system, the sampling process comprising the steps of:

generating a profile tree comprising a plurality of hierarchical levels including a first hierarchical level and a second hierarchical level, each hierarchical level having at least one node, wherein each node comprises an array of counters, with each counter mapped to an associated range of memory locations in the computer memory, and wherein each counter of a node of said second hierarchical level maps to a respective second range of memory locations which is within a first range of memory locations that is mapped to a counter of a node of said first hierarchical level;

receiving a program counter value; and searching the profile tree according to the hierarchy of nodes to locate a counter of a node at said second hierarchical level that maps to a memory range which includes a memory location identified by the program counter value.

2. A dynamic adaptive sampling process to provide performance analysis on a computer system, the sampling process comprising the steps of:

generating a profile tree comprising a plurality of hierarchical levels including a first hierarchical level and a second hierarchical level, each hierarchical level having at least one node, wherein each node comprises an array of counters, with each counter mapped to an associated range of memory locations in the computer memory, and wherein each counter of a node of said second hierarchical level maps to a respective second range of memory locations which is within a first range of memory locations that is mapped to a counter of a node of said first hierarchical level;

receiving a program counter value;

searching the profile tree according to the hierarchy of nodes to locate a counter of a node at said second hierarchical level that maps to a memory range which includes a memory location identified by the program counter value; and detecting whether a count value of the located counter exceeds a threshold value, wherein if said count value exceeds the threshold value, then the sampling process further comprises modifying the profile tree; and wherein if said count value does not exceed the threshold value, then incrementing said count value.

3. A dynamic adaptive sampling process of claim 2 wherein the step of modifying the profile tree further comprises:

adding a new node to the profile tree, the new node being at a third hierarchical level and comprising an array of new counters, each new counter mapped to a respective range of memory locations which is within the range of memory locations associated with the located counter; and identifying one of said new counters that maps to a range of memory locations which includes the memory location identified by the program counter value and incrementing that new counter.

4. A dynamic adaptive sampling process of claim 3 wherein the step of modifying the profile tree further comprises inserting a new pointer in the located counter to point to the added new node of the profile tree.

5. A dynamic adaptive sampling process of claim 4 further comprising the step of generating a sampling profile result.

6. A dynamic adaptive sampling process of claim 4 wherein a number of counters in the array of new counters comprises a number that is equivalent to a power of 2.

7. A dynamic adaptive sampling process of claim 3 wherein a number of counters in the array of new counters comprises a number that is equivalent to a power of 2.

8. A dynamic adaptive sampling process to provide performance analysis on a computer system, the sampling process comprising the steps of:

generating a profile tree comprising a hierarchy of one or more nodes, each node in the hierarchy comprises an array of counters, with each counter mapped to an associated range of memory locations in the computer memory, receiving a program counter value;

searching the profile tree according to the hierarchy of nodes to locate a counter that maps to a range of memory locations which includes a memory location identified by the program counter value;

detecting whether the located counter comprises an associated pointer to another node in the profile tree, wherein if a pointer is detected, then repeating the searching step to locate an associated counter until the located counter does not comprise an associated pointer;

detecting whether a count value of the located counter exceeds a threshold value, wherein if said count value exceeds the threshold value, then the sampling process further comprises:

adding a new node to the profile tree, the new node comprising an array of new counters, each of the new counters mapped to a respective range of memory locations within the range of memory locations associated with the located counter;

identifying one of said new counters that maps to a range of memory locations which includes the memory location identified by the program counter value and incrementing that new counter; and inserting a new pointer to the added new node in the located counter; and wherein if said count value does not exceed the threshold value, then incrementing said count value.

9. A dynamic adaptive sampling process of claim 8 further comprising the step of generating a sampling profile result.

10. A dynamic adaptive sampling process of claim 8 wherein a number of counters in the array of new counters comprises a number that is equivalent to a power of 2.

11. A dynamic adaptive sampling process for a computer comprising the steps of:

detecting a triggering event;

generating a profile tree comprising a plurality of hierarchical levels including a first hierarchical level and a second hierarchical level, each hierarchical level having at least one node, in response to detecting the triggering event, wherein each node comprises an array of counters, with each counter mapped to an associated range of memory locations, and wherein each counter of a node of said second hierarchical level maps to a respective second range of memory locations which is within a first range of memory locations that is mapped to a counter of a node of said first hierarchical level;

executing a sampling sequence process, the sampling sequence process comprising:

receiving a program counter value;

searching the profile tree according to the hierarchy of nodes to locate a counter of a node at said second hierarchical level that maps to a memory range which includes a memory location identified by the program counter value; and detecting whether a count value of the located counter exceeds a threshold value, wherein if said count value exceeds the threshold value, then the sampling process further comprises modifying the profile tree; and wherein if said count value does not exceed the threshold value, then incrementing said count value; and terminating the sampling sequence in response to detecting a sampling terminating event.

12. A dynamic adaptive sampling process of claim 11 wherein the step of modifying the profile tree further comprises:

adding a new node to the profile tree at a third hierarchical level, the new node comprising an array of new counters, each new counter mapped to a respective range of memory locations which is within the range of memory locations associated with the located counter;

identifying one of said new counters that maps to a range of memory locations which includes the memory location identified by the program counter value and incrementing that new counter; and inserting a new pointer in the located counter to point to the added new node of the profile tree.

13. A dynamic adaptive sampling process of claim 11 further comprising the step of generating a sampling profile result.

14. A dynamic adaptive sampling process of claim 11 wherein a number of counters in the array of new counters comprises a number that is equivalent to a power of 2.

15. A dynamic adaptive sampling process of claim 11 wherein the profile tree includes an intervening hierarchical level having an intermediate node, where each counter of the intermediate node maps to a respective intermediate range of memory locations which is within said first range of memory locations, such that the respective second range of memory locations associated with said located counter is within the intermediate range of memory locations associated with a counter of said intermediate node; wherein the step of searching the profile tree further comprises identifying a counter of said intermediate node which comprises an associated pointer to a node at said second hierarchical level in the profile tree.

16. A dynamic adaptive sampling process of claim 11 further comprising the step of repeating the step of executing the sampling sequence process in response to not detecting a sampling terminating event.

17. A dynamic adaptive sampling process of claim 16 wherein the step of modifying the profile tree further comprises:
   adding a new node to the profile tree at a third hierarchical level, the new node comprising an array of new counters, each new counter mapped to a respective range of memory locations which is within the range of memory locations associated with the located counter; and
   identifying one of said new counters that maps to a range of memory locations which includes the memory location identified by the program counter value and incrementing that new counter.

18. A dynamic adaptive sampling process of claim 17 wherein the step of modifying the profile tree further comprises inserting a new pointer in the located counter to point to the added new node of the profile tree.

19. A dynamic adaptive sampling process of claim 18 further comprising the step of generating a sampling profile result.

20. A dynamic adaptive sampling process of claim 18 wherein a number of counters in the array of new counters comprises a number that is equivalent to a power of 2.

21. A dynamic adaptive sampling process of claim 17 wherein a number of counters in the array of new counters comprises a number that is equivalent to a power of 2.

22. A dynamic adaptive sampling process for a computer comprising the steps of:
   detecting a triggering event, wherein the triggering event comprises a CPU of the computer receiving a new application execution request;
   generating a profile tree comprising a plurality of hierarchical levels including a first hierarchical level and a second hierarchical level, each hierarchical level having at least one node, in response to detecting the triggering event, wherein each node comprises an array of counters, with each counter mapped to an associated range of memory locations, and wherein each counter of a node of said second hierarchical level maps to a respective second range of memory locations which is within a first range of memory locations that is mapped to a counter of a node of said first hierarchical level;
   executing a sampling sequence process, the sampling sequence process comprising:
   receiving a program counter value;
   searching the profile tree according to the hierarchy of nodes to locate a counter of a node at said second hierarchical level that maps to a memory range which includes a memory location identified by the program counter value; and
   detecting whether a count value of the located counter exceeds a threshold value,
   wherein if said count value exceeds the threshold value, then the sampling process further comprises modifying the profile tree; and
   wherein if said count value does not exceed the threshold value, then incrementing said count value;
   detecting a sampling terminating event; and
   terminating the sampling sequence in response to detecting the sampling terminating event.

23. A dynamic adaptive sampling process of claim 22 wherein the step of modifying the profile tree further comprises:
   adding a new node to the profile tree at a third hierarchical level, the new node comprising an array of new counters, each new counter mapped to a respective range of memory locations which is within the range of memory locations associated with the located counter;
   identifying one of said new counters that maps to a range of memory locations which includes the memory location identified by the program counter value and incrementing that new counter; and
   inserting a new pointer in the located counter to point to the added new node of the profile tree.

24. A dynamic adaptive sampling process of claim 23 further comprising the step of generating a sampling profile result.

25. A dynamic adaptive sampling process of claim 23 wherein a number of counters in the array of new counters comprises a number that is equivalent to a power of 2.

26. A dynamic adaptive sampling process of claim 22 wherein the step of detecting a sampling terminating event comprises detecting an application termination signal.

27. A dynamic adaptive sampling process of claim 26 wherein the step of modifying the profile tree further comprises:
   adding a new node to the profile tree at a third hierarchical level, the new node comprising an array of new counters, each new counter mapped to a respective range of memory locations which is within the range of memory locations associated with the located counter;
   identifying one of said new counters that maps to a range of memory locations which includes the memory location identified by the program counter value and incrementing that new counter; and
   inserting a new pointer in the located counter to point to the added new node of the profile tree.

28. A dynamic adaptive sampling process of claim 27 further comprising the step of generating a sampling profile result.

29. A dynamic adaptive sampling process of claim 26 wherein a number of counters in the array of new counters comprises a number that is equivalent to a power of 2.

30. A dynamic adaptive sampling process of claim 22 wherein the step of detecting a sampling terminating event comprises detecting a termination instruction.

31. A dynamic adaptive sampling process of claim 30 wherein the step of modifying the profile tree further comprises:
   adding a new node to the profile tree at a third hierarchical level, the new node comprising an array of new counters, each new counter mapped to a respective range of memory locations which is within the range of memory locations associated with the located counter;

identifying one of said new counters that maps to a range of memory locations which includes the memory location identified by the program counter value and incrementing that new counter; and inserting a new pointer in the located counter to point to the added new node of the profile tree.

32. A dynamic adaptive sampling process of claim 31 wherein a number of counters in the array of new counters comprises a number that is equivalent to a power of 2.

33. A dynamic adaptive sampling process of claim 30 further comprising the step of generating a sampling profile result.

34. A dynamic adaptive sampling process for a computer, comprising the steps of:

determining an accessed memory location from a program counter of the computer;

identifying a first counter which corresponds to said accessed memory location from a first plurality of counters, each of said first plurality of counters being associated with a respective range of memory locations such that said first counter comprises that counter from said first plurality of counters which is associated with the range of memory locations which includes said accessed memory location;

detecting whether a count value of said first counter exceeds a threshold value;

incrementing the count value of said first counter if said count value does not exceed said threshold value; and generating a second plurality of counters if said count value exceeds said threshold value, each of said second plurality of counters being associated with a respective range of memory locations within the range of memory locations associated with said first counter, and incrementing a second counter from said second plurality of counters which is associated with the range of memory locations which includes said accessed memory location.

35. A dynamic adaptive sampling process according to claim 34, further including the step of providing a pointer from said first counter to said second plurality of counters.

* * * * *